(12) United States Patent
Gretz

(10) Patent No.: US 8,844,888 B1
(45) Date of Patent: Sep. 30, 2014

(54) STRUT CLIP

(71) Applicant: Thomas J. Gretz, Port St. Lucie, FL (US)

(72) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 13/740,172

(22) Filed: Jan. 12, 2013

Related U.S. Application Data

(60) Provisional application No. 61/702,909, filed on Sep. 19, 2012.

(51) Int. Cl.
*A47B 96/06* (2006.01)
*F16L 3/12* (2006.01)

(52) U.S. Cl.
CPC .......................................... *F16L 3/12* (2013.01)
USPC ..................... 248/231.81; 248/316.7; 411/85; 411/549; 403/348

(58) Field of Classification Search
USPC ........... 248/316.7, 231.81, 230.7, 228.7, 214, 248/227.4, 228.2, 231.31; 24/458, 297, 24/615, 616, 630; 403/348, 252, 254; 411/84, 85, 349, 549, 553
See application file for complete search history.

(56) References Cited

U.S. PATENT DOCUMENTS

| | | | | |
|---|---|---|---|---|
| 4,666,355 A * | 5/1987 | Stover | .............................. | 411/85 |
| 4,840,525 A * | 6/1989 | Rebentisch | ..................... | 411/85 |
| 5,655,865 A * | 8/1997 | Plank et al. | ..................... | 411/85 |
| 5,875,600 A * | 3/1999 | Redman | ....................... | 52/656.4 |
| 5,893,538 A * | 4/1999 | Onishi et al. | ..................... | 248/65 |
| 6,290,426 B1 * | 9/2001 | van Gijsel et al. | .......... | 403/374.3 |
| 6,712,540 B2 * | 3/2004 | Schmalzhofer et al. | ...... | 403/248 |
| 7,137,753 B2 * | 11/2006 | Herb | ............................. | 403/348 |
| 7,293,935 B2 * | 11/2007 | Band et al. | .................... | 403/254 |
| 2004/0228681 A1 * | 11/2004 | Herb | ............................. | 403/348 |

* cited by examiner

*Primary Examiner* — Alfred J Wujciak

(57) ABSTRACT

A strut clip for facilitating attachment of pipe hangers, electrical conduit, or other structures to open channel unistruts. The strut clip includes an assembly of a face element and a nut element. The face element includes a centrally located threaded aperture, a face element rear surface, and a pair of flanges extending rearwardly from the face element rear surface. The nut element includes a nut element rear surface, an unthreaded aperture for free passage of a fastener, and a pair of openings therein. The flanges of the face element extend through the openings in the nut element thereby forming the strut clip assembly. Nut element further includes a narrow side, a wide side, and beveled edges that enable attachment to a unistrut by simply inserting the narrow side of the nut portion into the open channel of the unistrut and rotating the assembly by 90 degrees.

2 Claims, 8 Drawing Sheets

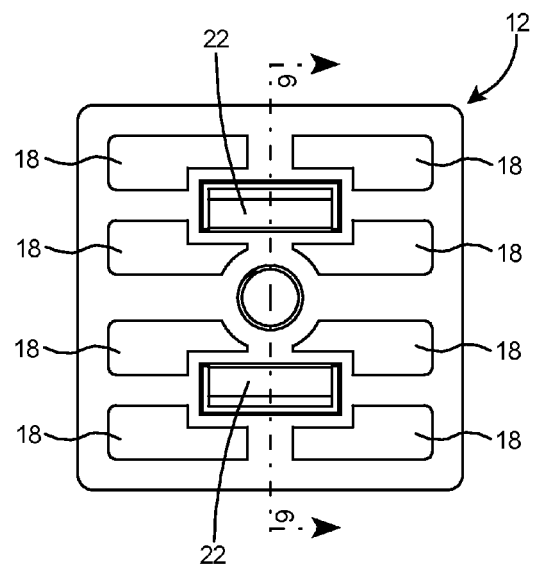
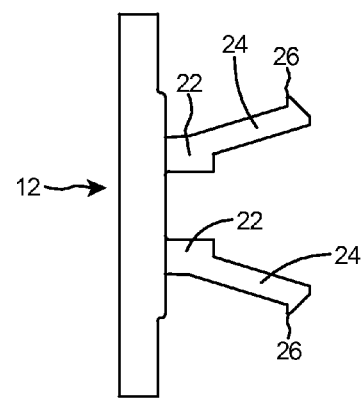
Fig. 3
Fig. 4
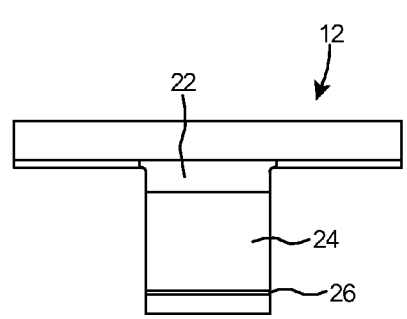
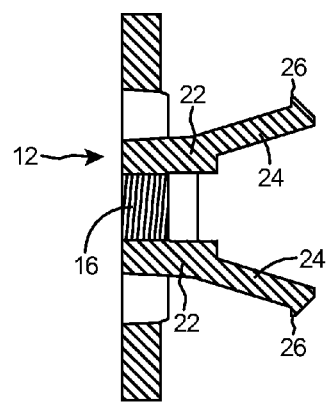
Fig. 5
Fig. 6

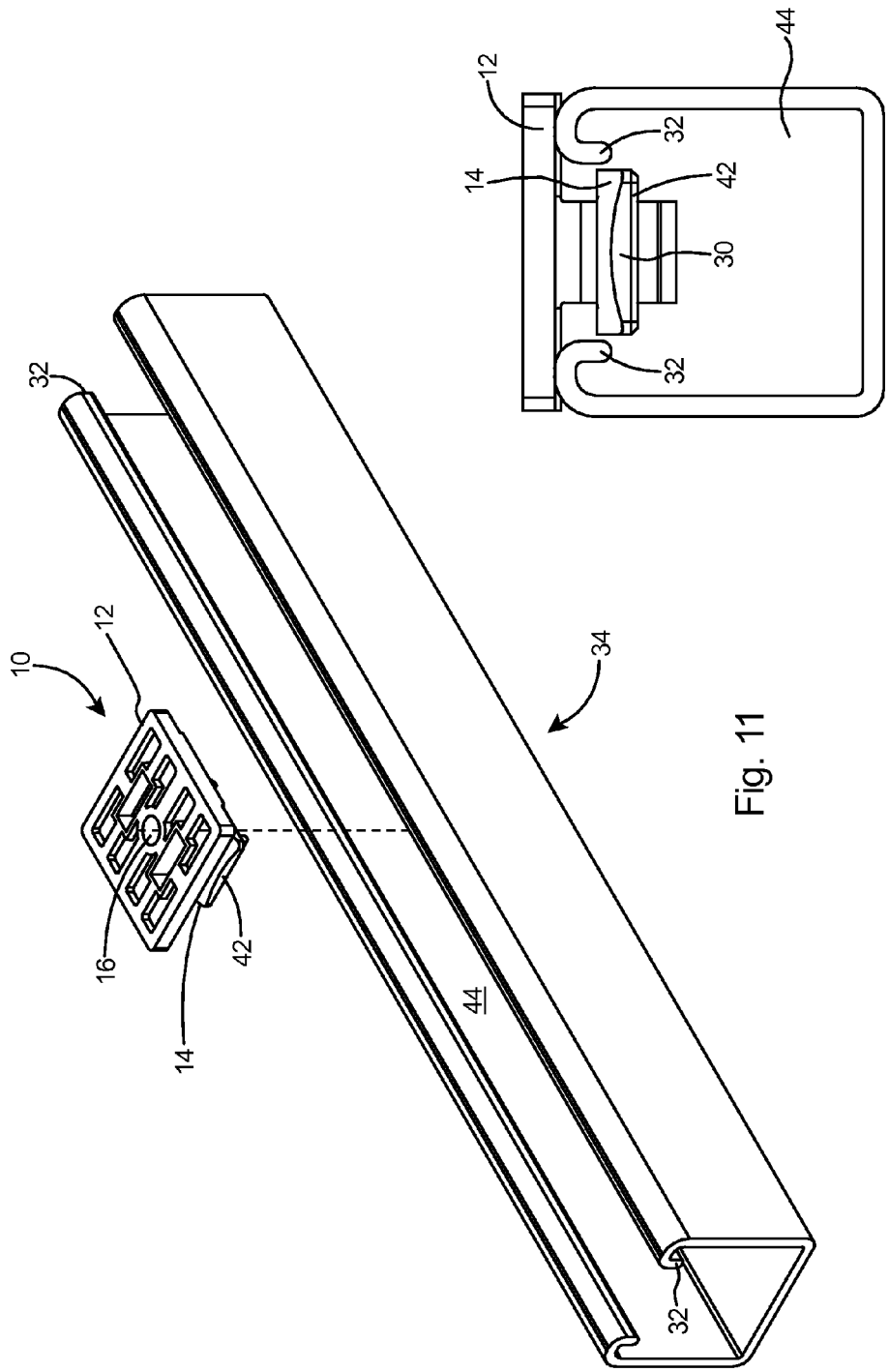

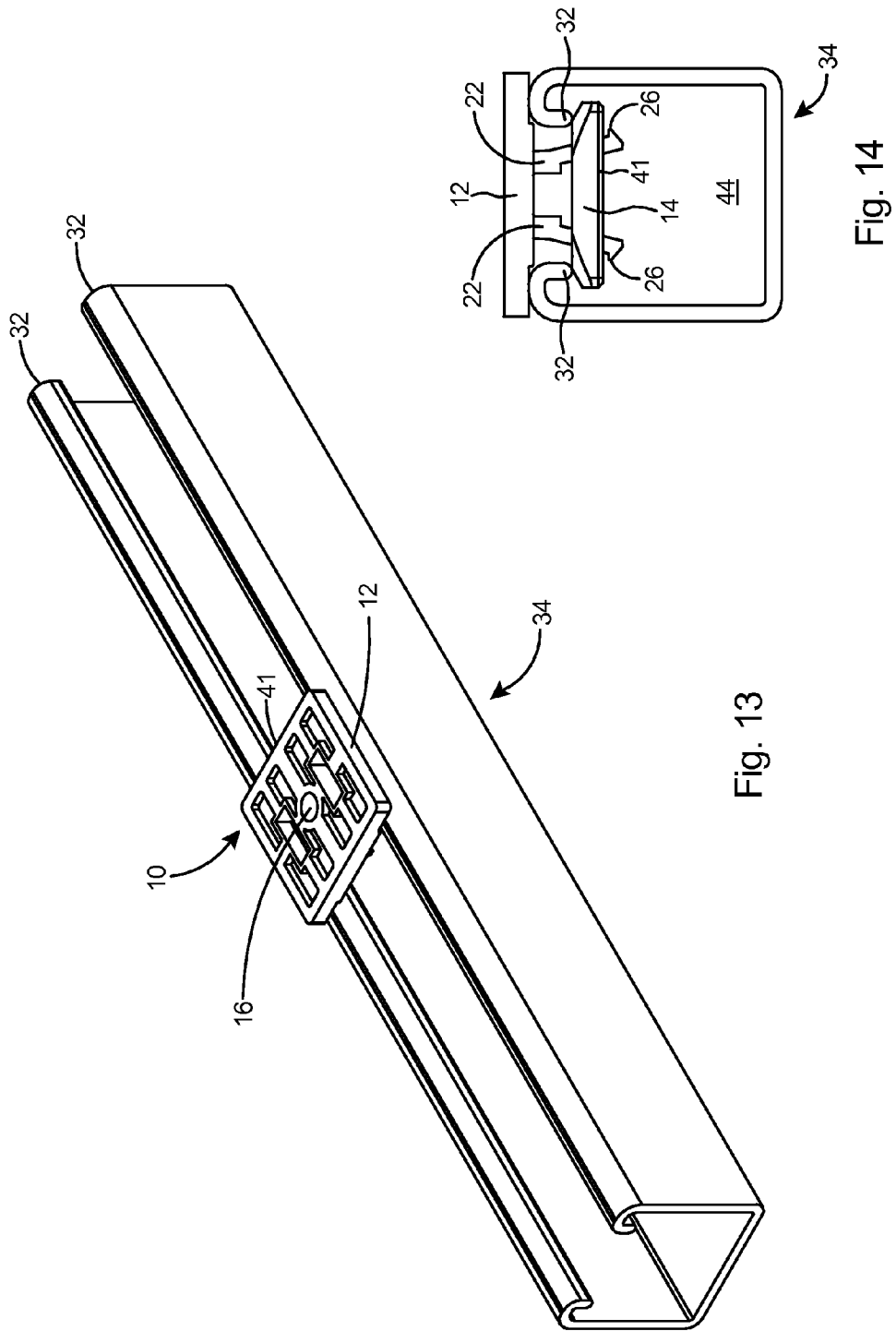

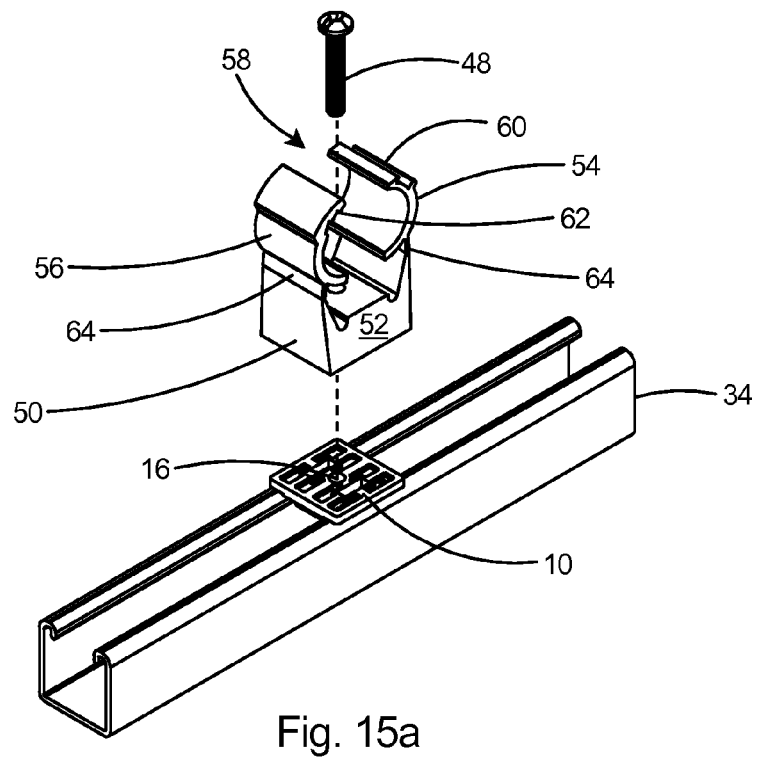
Fig. 15a
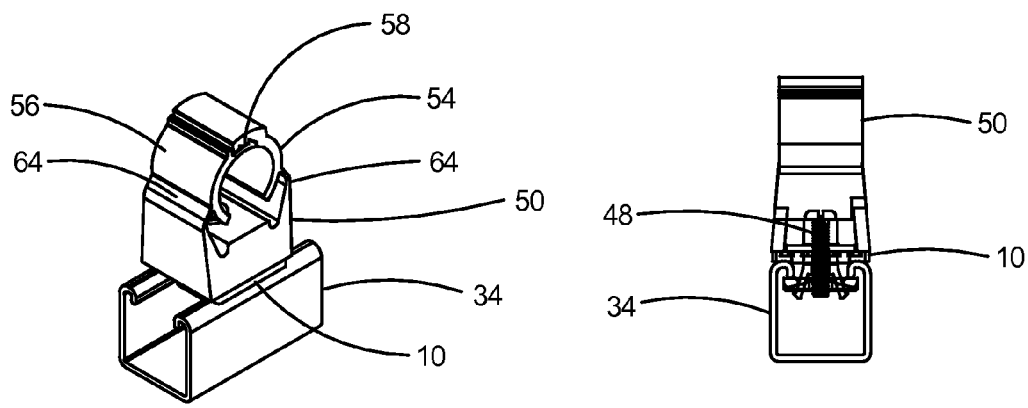
Fig. 15b
Fig. 15c

STRUT CLIP

This application claims the priority of Provisional U.S. Patent Application Ser. No. 61/702,909 filed Sep. 19, 2012.

FIELD OF THE INVENTION

The present invention relates to devices for the attachment of pipe hangers, electrical conduit, cross struts and the like to supporting struts.

BACKGROUND OF THE INVENTION

The installation of pipe and electrical conduit hangers on supporting open channel unistruts can be a time consuming, tedious and labor intensive operation because of the need to insert and separately attach the hanger or cross strut to the open strut with individual, and sometimes a plurality of, hanger fasteners. Accordingly, a strut attachment system that simplified the attachment operation and minimized the number of attachment elements would be of great benefit to installers of such devices and result in time and money savings due to reduced installation time.

A strut attachment device that could be used in a horizontal or vertical orientation, indoor or outdoor applications and accommodate a variety of electrical conduit, pipe or cross strut sizes would also provide additional time and labor saving benefits.

OBJECT OF THE INVENTION

It is therefore and object of the present invention to provide an easily and quickly installable strut attachment device for the installation of a variety of electrical conduit, pipe or cross struts in a horizontal or vertical orientation and in indoor or outdoor installations.

SUMMARY OF THE INVENTION

A strut clip for hollow open channel unistruts that provides an attachment point for cross-mounted unistruts, pipe hangers, electrical conduit or other structures or supported objects that can be mounted on the open channel unistrut. The strut clip of the present invention includes an assembly of a face element and a nut element. The face element includes a centrally located threaded aperture, a face element rear surface, and a pair of semi rigid engagement flanges extending rearwardly from the face element rear surface. The nut element includes a nut element rear surface, an unthreaded aperture for free passage of a fastener, and a pair of openings therein. The pair of semi rigid engagement flanges of the face element extends through the openings in the nut element thereby forming the strut clip assembly. Nut element further includes a narrow side, a wide side, and beveled edges that enable attachment to a unistrut. The strut clip assembly may be attached to a unistrut by inserting the narrow side of the nut portion into the open channel of the unistrut and rotating the assembly by 90 degrees such that beveled edges pass under longitudinal ridges of unistrut and engage the wide sides of nut element 14.

BRIEF DESCRIPTION OF THE DRAWINGS

Reference is made herein to the accompanying drawings, which are not necessarily drawn to scale, and wherein:

FIG. 3 is a top plan view of the strut clip of the present invention.

FIG. 4 is a side view of the strut clip of the present invention.

FIG. 5 is an end view of the strut clip of the present invention.

FIG. 6 is a cross sectional view of the strut clip of the present invention along line 6-6 of FIG. 3.

FIG. 11 is a perspective view showing the strut clip of the present invention being inserted into a unistrut element.

FIG. 12 is a cross-sectional view showing the strut clip of the present invention inserted into a unistrut prior to rotation and securing.

FIG. 13 is a perspective view of the strut clip of the present invention inserted into a unistrut after rotation and securing.

FIG. 14 is a cross-sectional view of the strut clip of the present invention inserted into a unistrut after rotation and securing.

FIG. 15a is an exploded perspective view depicting a conduit or pipe hanger in alignment to be attached to an open channel unistrut by the strut clip of the present invention.

FIG. 15b is a perspective view depicting the conduit or pipe hanger of FIG. 15a attached to the open channel unistrut by the strut clip of the present invention.

FIG. 15c is a conceptual view depicting the conduit or pipe hanger of FIG. 15b secured to the open channel unistrut by the strut clip.

DETAILED DESCRIPTION

Figure 1:
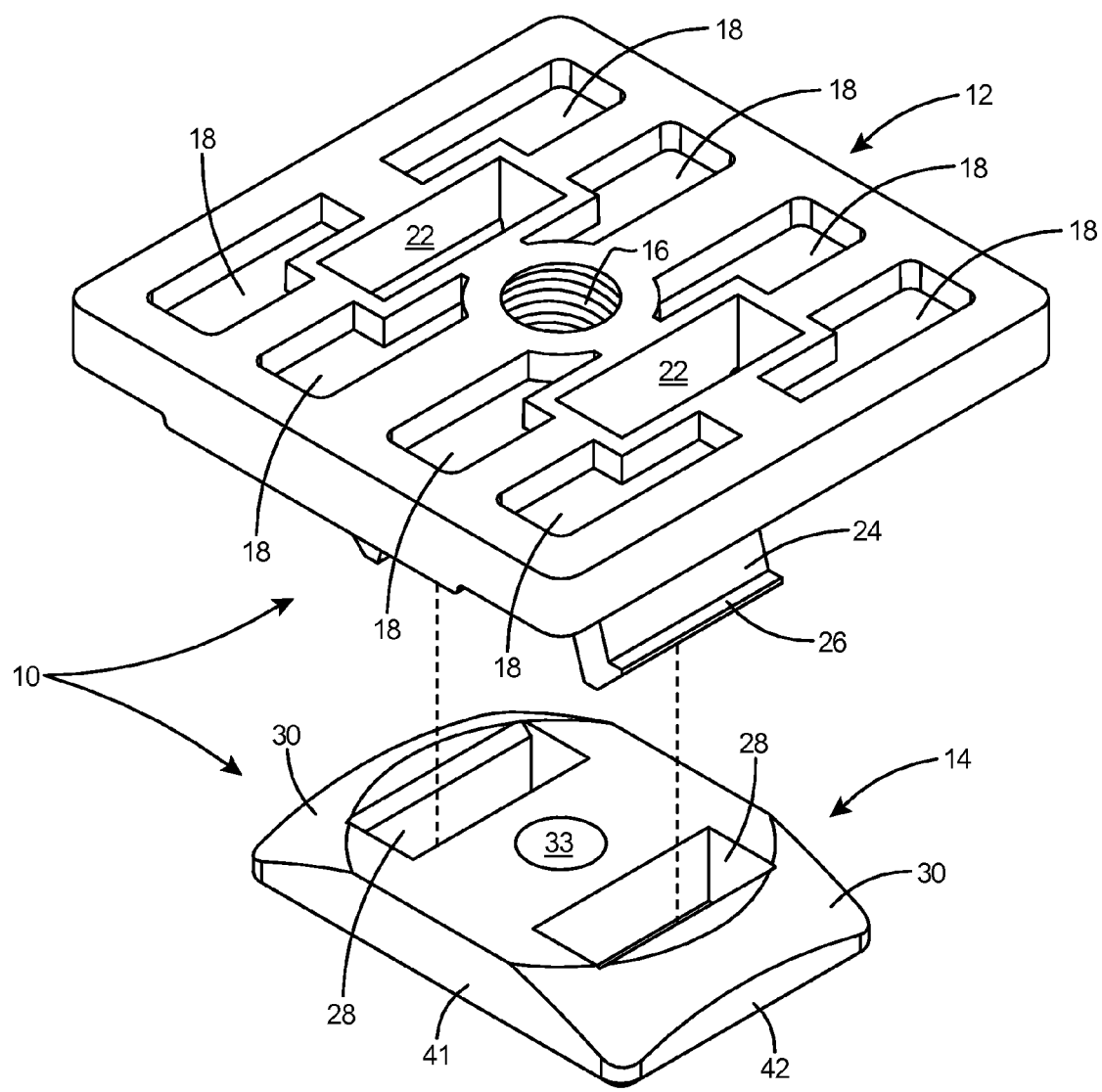
FIG. 1 is an exploded perspective front view of the strut clip of the present invention.
Figure 2:
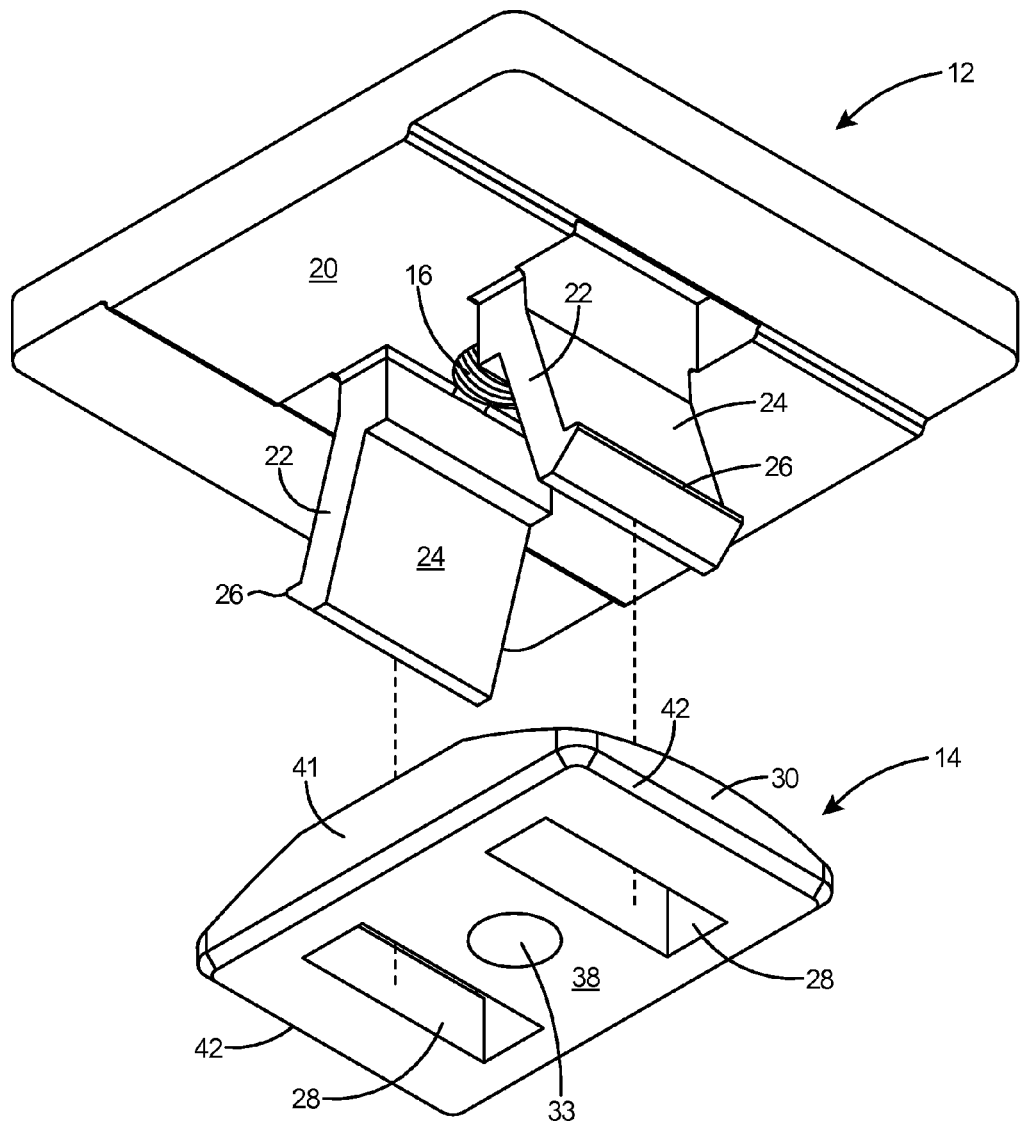
FIG. 2 is an exploded perspective rear view of the strut clip of the present invention.
Figure 7:
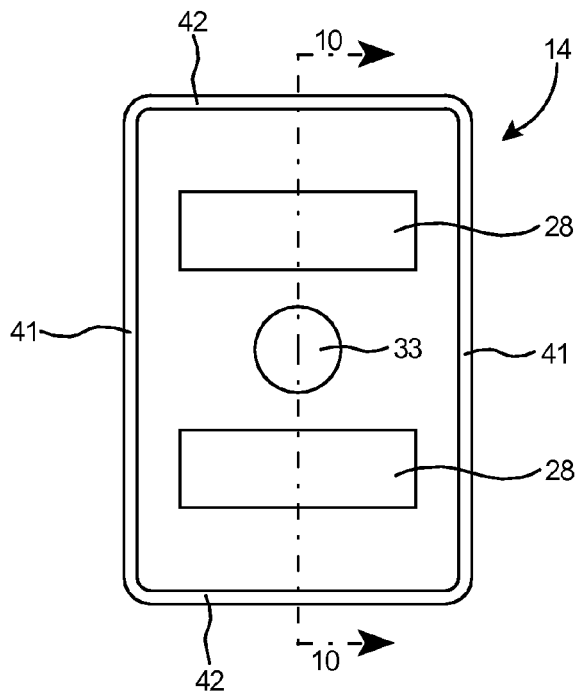
FIG. 7 is a top plan view of the nut element of the strut clip of the present invention.
Figure 8:
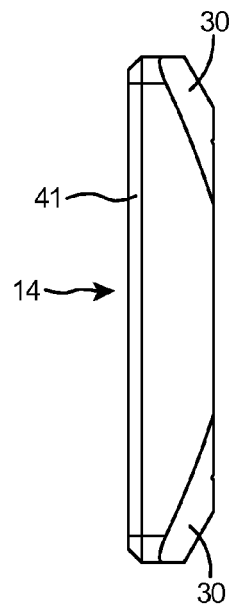
FIG. 8 is a side view of the nut element of the strut clip of the present invention.
Figure 9:
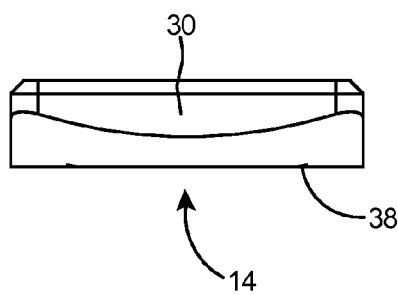
FIG. 9 is an end view of the nut element of the strut clip of the present invention.
Figure 10:
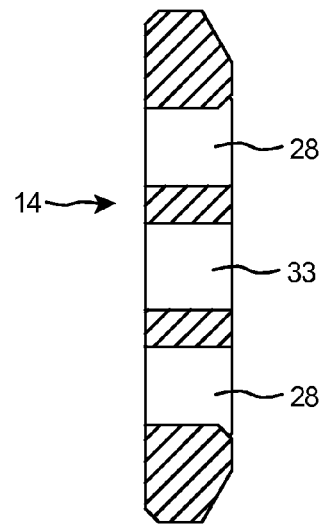
FIG. 10 is cross sectional view of the nut element of the present invention along the line 10-10 of FIG. 7.

The present invention comprises a strut clip for hollow open channel unistruts that provides an attachment point for cross-mounted unistuts, pipe hangers or other structures or supported objects that can be mounted on the open channel unistrut.

Referring now to the accompanying Figures, as shown in FIGS. 1-10, strut clip 10 of the present invention comprises a face element 12 and a nut element 14. Face element 12 includes a centrally located threaded aperture 16 for insertion of an appropriate fastener, bolt or screw 48 (shown in FIG. 15a), a rear surface 20, and a series of recesses 18 which while reducing the amount of material required to fabricate strut clip 10 do not significantly reduce its load carrying strength for its intended purpose.

Extending rearwardly from rear surface 20 of face element 12 are a pair of semi rigid engagement flanges 22. Each of semi rigid engagement flanges 22 includes a bendable or flexible portion 24 and a longitudinal ridge 26 that, as shown below, pass through apertures 28 in nut element 14 and engage rear surface 38 of nut element 14.

Nut element 14 includes beveled edges 30 on narrow aspect or side 42 for ease of engagement with ribs 32 (see FIG. 12) of open channel unistrut 34, as described below, and apertures 28 through which semi rigid engagement flanges 22 are inserted. When semi rigid engagement flanges 22 are inserted through apertures 28 they initially retract toward the center of nut element 14 to allow for passage of longitudinal ridges 26 through apertures 28 and then expand to allow for engagement of longitudinal ridges 26 with rear surface 38 of nut element 14. Nut element 14 also includes an unthreaded aperture 33 for free passage of fastener 48.

Referring now to FIGS. 11-14, as shown in FIG. 11 strut clip 10 is inserted into unistrut 34 with nut element 14 rotated such that narrow aspect/side 42 of nut element 14 lies parallel to channel 44 and is easily inserted into channel 44, as best seen in FIG. 12. Once nut element 14 is thus inserted into channel 44 it is rotated 90 degrees such that beveled edges 30 pass under longitudinal ridges 26 of unistrut 34 thereby causing engagement of wide sides or aspects 41 of nut element 14 therewith (see FIGS. 13 and 14).

Figure 16:
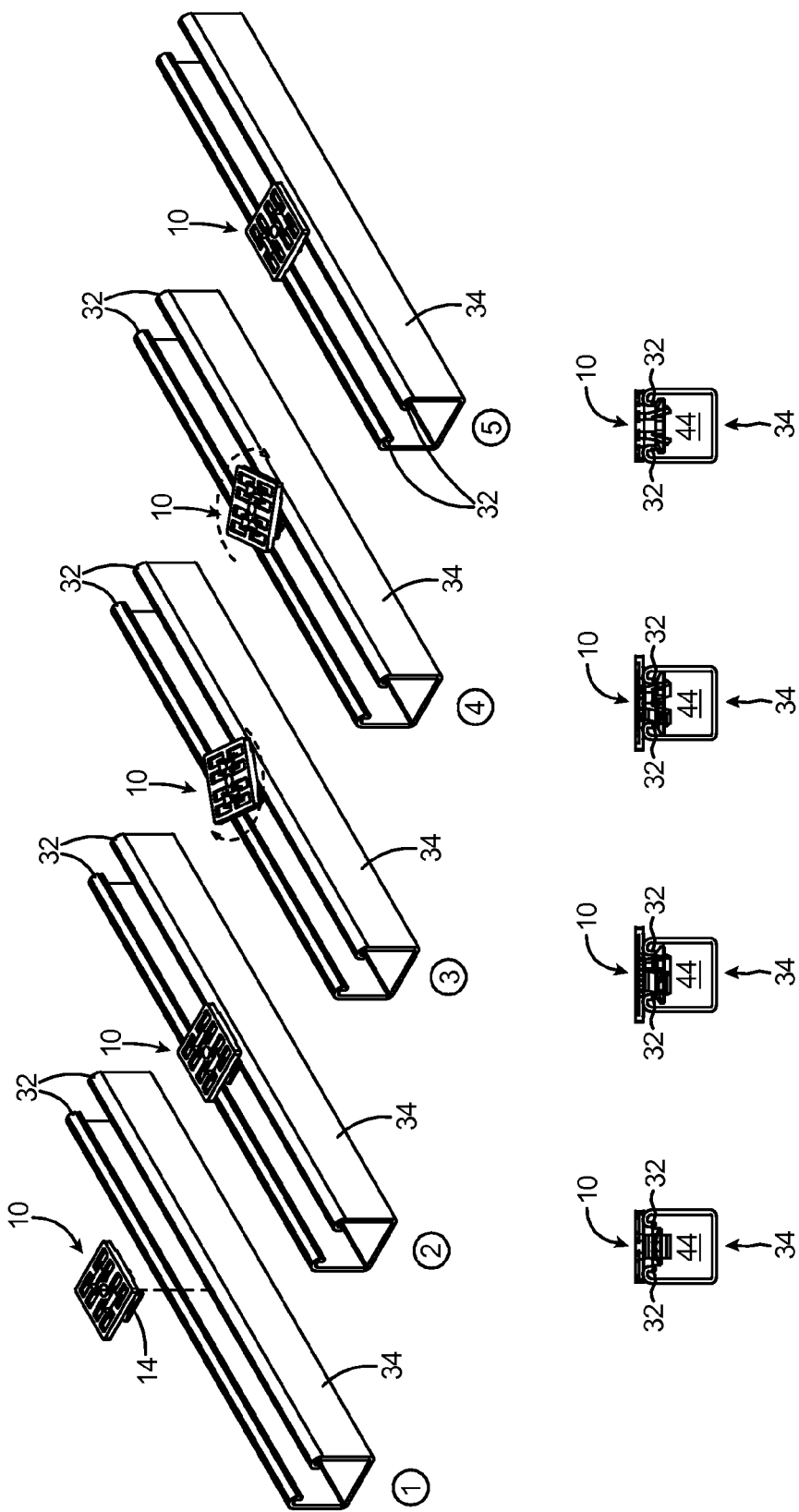
FIG. 16 is an assembly drawing showing the various steps in the installation procedure for installing the strut clip of the present invention into a unistrut.

A complete assembly procedure is depicted in FIG. 16 wherein insertion of nut element 14 into channel 44, rotation of strut clip assembly 10 by 90 degrees in a clockwise or counter clockwise direction causes passage of beveled edges 30 of nut 14 below longitudinal ridges 26 of unistrut 34 and engagement of wide edges 41 of strut clip 10 with ribs 32 of open channel unistrut 34.

With reference to FIGS. 15a-15c there is depicted one usage of the strut clip of the present invention, which is the securing of an electrical conduit or a pipe to a unistrut. After strut clip 10 is mounted to unistrut 34 as described hereinabove, an attachment device such as a conduit or pipe hanger 50, hereinafter "pipe hanger", or the like can be attached to strut clip 10 via insertion of a suitable fastener such as a screw or bolt 48 inserted though threaded aperture 16 in strut clip 10. Pipe hanger 50 includes a base 52 and a first resilient arm 54 and a second resilient arm 56 including a latching mechanism 58 thereon. The latching mechanism 58 includes outward extending teeth 60 on the first arm 54 and inward extending teeth 62 on the second arm 56. Arms 54 and 56 are connected to base 52 by narrow shoulders 64. The narrow shoulders 64 are integral with the arms 54 and 56 and the base 52. As the pipe hanger 50 is typically molded in one piece of plastic, arms 54 and 56 of pipe hanger 50 will flex with respect to the base 52. Thus the arms can be opened, a pipe or conduit can be inserted within the arms 54 and 56, and the arms pressed closed to retain the pipe or conduit (not shown) to the unitstrut 34. As the pipe hanger arms are closed, inward extending teeth 62 on second arm 56 ride up and over and engage outward extending teeth 60 of first arm 54 thereby locking the conduit or pipe within the pipe hanger 50.

In order to provide the flexibility required for the initial retraction of longitudinal ridges 26 through apertures 28 and then allow for engagement of longitudinal ridges 26 with rear surface 38 of nut element 14 it is preferred that strut clip 10 be fabricated from a UV rated non-metallic material.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A non-metallic strut clip for attachment to an open channel unistrut having longitudinal ridges, said strut clip comprising:

a face element including a centrally located threaded aperture, a face element rear surface for engaging the outer surface of said longitudinal ridges of said open channel unistrut, and a pair of semi rigid engagement flanges extending rearwardly from said face element rear surface;

a nut element having a nut element rear surface and an outer surface, an unthreaded aperture for free passage of a fastener, and a pair of openings therein, wherein said pair of semi rigid engagement flanges of said face element engage said pair of openings in said nut element to form a strut clip assembly;

a narrow aspect on said nut element, said narrow aspect including beveled edges on the outer surface of said nut element, said beveled edges of said nut element facing said rear surface of said face element in said strut assembly, wherein insertion of said nut element into said open channel unistrut and rotation of said strut clip by 90 degrees enables said beveled edges of said nut element to engage the inner surface of said longitudinal ridges of said open channel unistrut; and each of said semi rigid engagement flanges of said face element includes a bendable portion and a longitudinal ridge that passes through each of said openings in said nut element and engages said rear surface of said nut element, wherein the longitudinal ridge of said flange is adjacent to the bendable portion of said flange and the rear surface of the nut element is facing away from the inner surface of the longitudinal ridges of said open channel unistrut.

2. The non-metallic strut clip of claim 1 further including a conduit clamp; and said conduit clamp secured to said strut clip by a fastener secured through said threaded aperture of said face element.

* * * * *